(12) United States Patent
Guo et al.

(10) Patent No.: US 11,901,856 B2
(45) Date of Patent: Feb. 13, 2024

(54) PHOTOVOLTAIC TRACKING SUPPORT AND TRANSMISSION DEVICE THEREOF

(71) Applicant: Mokun Renewable Technologies Co., Ltd., Shanghai (CN)

(72) Inventors: Jiabao Guo, Shanghai (CN); Xiao Liu, Shanghai (CN)

(73) Assignee: Mokun Renewable Technologies Co., Ltd., Shanghai (CN)

( * ) Notice: Subject to any disclaimer, the term of this patent is extended or adjusted under 35 U.S.C. 154(b) by 23 days.

(21) Appl. No.: 17/754,241

(22) PCT Filed: Apr. 21, 2021

(86) PCT No.: PCT/CN2021/088627
§ 371 (c)(1),
(2) Date: Mar. 28, 2022

(87) PCT Pub. No.: WO2021/218732
PCT Pub. Date: Nov. 4, 2021

(65) Prior Publication Data
US 2022/0294385 A1    Sep. 15, 2022

(30) Foreign Application Priority Data
Apr. 27, 2020 (CN) .......................... 202020672094.8

(51) Int. Cl.
*H02S 20/32* (2014.01)
*H02S 30/10* (2014.01)

(52) U.S. Cl.
CPC .............. *H02S 20/32* (2014.12); *H02S 30/10* (2014.12)

(58) Field of Classification Search
CPC ........... H02S 20/32; H02S 20/10; H02S 30/10
See application file for complete search history.

(56) References Cited

U.S. PATENT DOCUMENTS

| 2018/0062567 A1* | 3/2018 | Oh | H02S 20/32 |
| 2018/0091088 A1* | 3/2018 | Barton | F24S 30/425 |
| 2018/0128515 A1* | 5/2018 | Habdank | F24S 25/70 |

FOREIGN PATENT DOCUMENTS

| CN | 201802818 | * | 4/2011 |
| CN | 201802818 U | | 4/2011 |

(Continued)

*Primary Examiner* — Jayne L Mershon
(74) *Attorney, Agent, or Firm* — GREENBERG TRAURIG LLP; Trenton A. Ward

(57) ABSTRACT

The present invention provides a transmission device applied to a photovoltaic tracking support. The photovoltaic tracking support comprises a stand column and a main beam. The main beam is rotatably supported on the stand column, and the main beam supports a photovoltaic assembly. The transmission device comprises a composite chain gear set and a composite chain wheel set. The composite chain gear set has multiple chain gears. The multiple chain gears are coaxially arranged and are arranged in a manner that the teeth are staggered. The composite chain wheel set has multiple chain wheels. The multiple chain wheels are coaxially arranged, and are in one-to-one correspondence to and meshing transmission with the multiple chain gears. One of the composite chain gear set and the composite chain wheel set is rotatably disposed on the stand column, and the other is connected to the main beam. The present invention also provides a photovoltaic tracking support comprising the transmission device. When the transmission device is applied to the photovoltaic tracking support, the shaking amplitude of the photovoltaic tracking support under the action of strong wind can be reduced, wear can be decreased, and the transmission device adapts to grease-free lubrication conditions.

10 Claims, 6 Drawing Sheets

(56) References Cited

FOREIGN PATENT DOCUMENTS

| CN | 110247622 | * | 9/2019 |
|----|-----------|---|--------|
| CN | 110247622 A | | 9/2019 |
| CN | 209959807 U | | 1/2020 |
| CN | 111431475 A | | 7/2020 |
| CN | 211557214 U | | 9/2020 |
| JP | 2015036603 A | | 2/2015 |

* cited by examiner

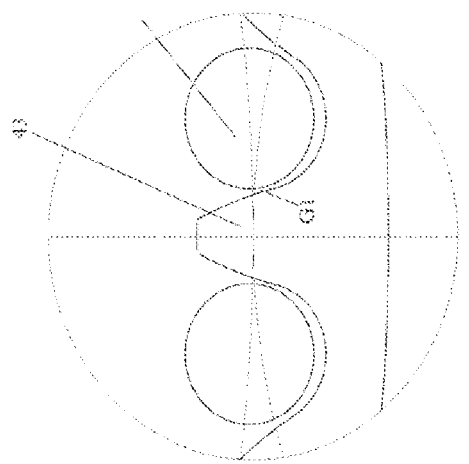
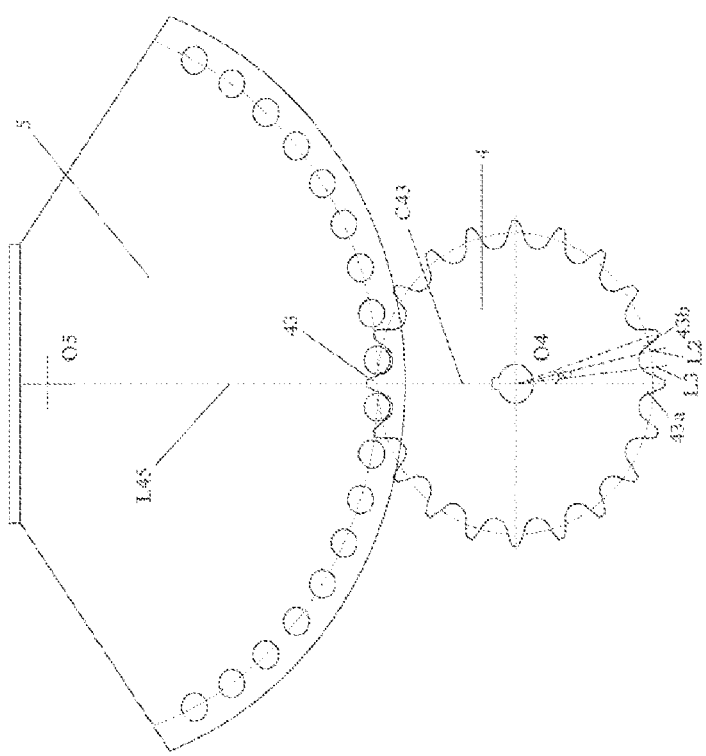
Fig. 8
Fig. 9

PHOTOVOLTAIC TRACKING SUPPORT AND TRANSMISSION DEVICE THEREOF

TECHNICAL FIELD

The present invention relates to a photovoltaic tracking support, in particular, to a transmission device for a photovoltaic tracking support.

BACKGROUND

In a photovoltaic power generation system, a photovoltaic tracking support, such as a flat single-axis tracking support, is one of the most commonly used photovoltaic array supports. Since the photovoltaic tracking support can track the changes in solar azimuth during the day, the total annual power generation of a photovoltaic module using the photovoltaic tracking support is 15%-25% higher than that of a photovoltaic module using an optimal fixed-inclination support.

In general, a drive unit such as a rotary reduction motor can be used to directly drive the photovoltaic tracking support to track and rotate, for example, a rotary bearing is directly mounted in the middle of the rotary main beam of the photovoltaic tracking support, and the reduction motor is used to drive the rotary bearing to rotate, thereby driving the photovoltaic tracking support to track and rotate. However, this tracking drive has its disadvantages. For example, this direct drive mode requires a relatively large rotational torque output by the rotary reduction motor to effectively drive the flat single-axis tracking support to track the rotation, so that the rotary reduction motor is selected with relatively large specifications and relatively high cost and power consumption. Secondly, a section of a length needs to be vacated in the middle of the rotating main beam of the photovoltaic tracking support so as to mount the rotary reduction motor, and the photovoltaic module cannot be mounted at this position, so that the mounting arrangement of the photovoltaic module on the main beam is not compact enough.

Chinese utility model patent CN 209949041 U discloses a solution for realizing the tracking drive of a photovoltaic tracking support by means of meshing transmission of chain gear teeth and chain wheels. The inventors believe that driving the tracking rotation of the photovoltaic tracking support by means of a chain gear tooth and chain wheel meshing transmission or a chain wheel set compared to directly driving the tracking rotation of the photovoltaic tracking support by means of a drive unit, allows the use of a drive unit of a smaller size, such as a rotary reduction motor, to generate a larger driving torque by selecting a suitable ratio of the radii of the chain gear and the chain wheel, both saving the cost of the drive device and reducing the operating energy consumption of the drive device. Furthermore, the mounting arrangement of the photovoltaic modules on the main beam of the photovoltaic tracking support can be made more compact by driving the photovoltaic tracking support to track and rotate through a chain wheel set, which saves both cost and floor space.

However, the inventor has found that when using a chain wheel set as a transmission to achieve the tracking drive described above, i.e., using a chain gear with a chain wheel, the photovoltaic tracking will, in actual operation, roll back and forth, e.g., east-west, under the influence of a strong wind. Moreover, in practical work, the mesh site of the chain gear and the chain wheel of the photovoltaic tracking support runs in the exposed state in the field for a long time, so it is difficult to implement effective grease lubrication, and the great back-and-forth shaking amplitude will cause serious wear and affect the service life of the photovoltaic tracking support.

The present invention is directed to solving at least one of the problems set forth above.

SUMMARY

It is an object of the present invention to provide a transmission device which, when applied to the photovoltaic tracking support, the shaking amplitude of the photovoltaic tracking support under the action of strong wind can be reduced, and wear can be decreased.

It is another object of the present invention to provide a transmission device that reduces wear and accommodates grease-free conditions when used in a photovoltaic tracking support.

The present invention provides a transmission device applied to a photovoltaic tracking support. The photovoltaic tracking support comprises a stand column and a main beam. The main beam is rotatably supported on the stand column, and the main beam supports a photovoltaic assembly. The transmission device comprises a composite chain gear set and a composite chain wheel set. The composite chain gear set has multiple chain gears. The multiple chain gears are coaxially arranged and are arranged in a manner that the teeth are staggered. The composite chain wheel set has multiple chain wheels. The multiple chain wheels are coaxially arranged, and are in one-to-one correspondence to and meshing transmission with the multiple chain gears. One of the composite chain gear set and the composite chain wheel set is rotatably disposed on the stand column, and the other is connected to the main beam.

In one implementation, the composite chain wheel set has a first chain gear and a second chain gear, the centerline of either tooth tip of the first chain gear coinciding with the centerline of either tooth socket of the second chain gear.

In one implementation, the plurality of chain wheels all have the same indexing radius.

In one implementation, the number of teeth of the plurality of chain wheels is the same.

In one implementation, the composite chain wheel set has a first chain gear, a second chain gear and a third chain gear, the central angle corresponding to any two adjacent tips of the first chain gear being trisected by the centerline of any tip of the second chain gear and the centerline of any tip of the third chain gear.

In one implementation, the other side has a plurality of chain gears or a plurality of chain wheels which are all sector-shaped wheels connected below the main beam.

In one implementation, the plurality of chain gears is fixedly connected to each other; and/or the plurality of chain wheels are fixedly connected to each other.

In one implementation, the composite chain gear set is rotatably disposed on the stand column and the composite chain gear set connects to the main beam.

The present invention also provides a photovoltaic tracking support comprising a stand column and a main beam, the main beam being rotatably supported to the stand column and the main beam supporting a photovoltaic module, the photovoltaic tracking support further comprising the aforementioned transmission device.

In one implementation, the photovoltaic tracking support further comprises a drive unit for driving the one side to rotate.

In the above-mentioned transmission device, by using a plurality of chain gears arranged in a manner that the teeth are staggered and a plurality of chain wheels in meshing transmission with the chain gears, a relay transmission can be a relay transmission in which the gap between the meshing points of one pair of chain gears is small when the gap between the meshing points of the other pair of chain gears is large, the chain wheel transmission gap is reduced as a whole, and the gap variation is reduced. Therefore, the above-mentioned transmission device can effectively reduce the shaking amplitude of the photovoltaic tracking support under the action of strong wind and improve the wind resistance of the photovoltaic tracking support. Furthermore, the use of the above-mentioned transmission device can effectively reduce wear and adapt to the conditions without grease lubrication, thereby effectively improving the working performance of the chain wheel transmission mechanism under the conditions without grease lubrication in the field, and greatly increasing the service life of the transmission device and the photovoltaic tracking support.

BRIEF DESCRIPTION OF THE DRAWINGS

The above and other features, properties and advantages of the present invention will become more apparent from the following description of the embodiments with reference to the accompanying drawings, in which:

FIG. 8 is a schematic view of a chain gear and chain wheel in meshing transmission in a first state.

FIG. 9 is an enlarged view of a portion of FIG. 8 at the mesh site.

DETAILED DESCRIPTION

While the invention will be described in more detail in the following description, taken in conjunction with the detailed description and the accompanying drawings, in order to provide a thorough understanding of the invention, it will be apparent to a person skilled in the art that the invention can be practiced in many other ways than described herein, and the scope of the invention should not be limited by the specific embodiments set forth herein.

For example, a first feature subsequently described in the description as being formed on or above a second feature may include embodiments in which the first feature and the second feature are formed in a direct relationship, and may also include embodiments in which additional features are formed between the first feature and the second feature, such that there may not be a direct relationship between the first feature and the second feature. Further, where a first element is described as being connected or coupled to a second element, the description includes embodiments where the first element and the second element are directly connected or coupled to each other, as well as embodiments where one or more additional intervening elements are added to indirectly connect or couple the first element and the second element to each other.

Figure 1:
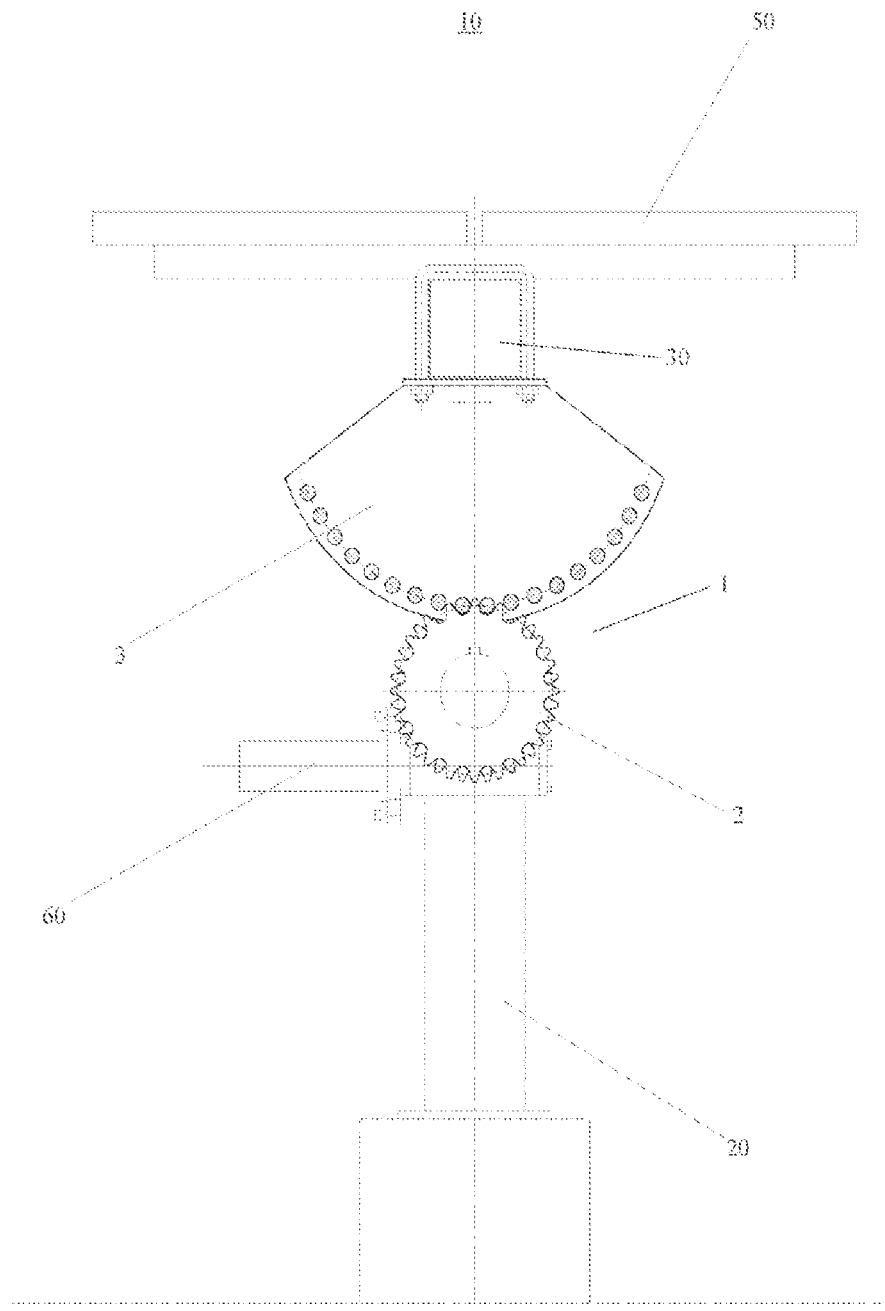
FIG. 1 is a front view of a photovoltaic tracking support.
Figure 2:
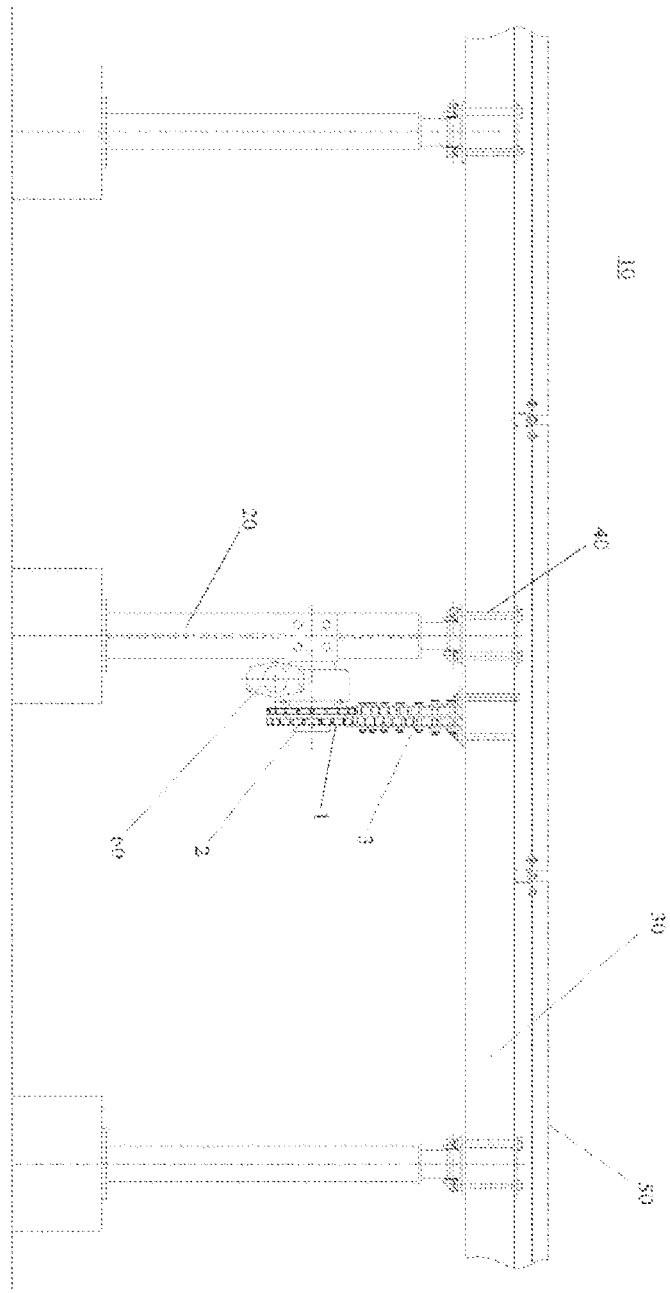
FIG. 2 is a side view of a photovoltaic tracking support.

FIGS. 1 and 2 show a front view and a side view, respectively, of a photovoltaic tracking support 10 according to the invention, exemplified by a flat single-axis tracking support. The photovoltaic tracking support 10 includes a stand column 20 and a main beam 30. The main beam 30 may be rotatably supported to the stand column 20, for example by a rotating support 40 in FIG. 2, which may be a rotating bearing, for example. The main beam 30 may support a photovoltaic module 50. As shown in FIG. 2, a plurality of stand columns 20 may be arranged in an extending direction of the main beam 30, in which three stand columns 20 are equidistantly arranged in the extending direction of the main beam 30, and the extending direction of the main beam 30 may be north-south. It is to be understood that the drawings are designed solely for purposes of illustration and not as a definition of the limits of the invention, for which reference should be made to the appended claims. In addition, variations in the different embodiments may be combined as appropriate.

The photovoltaic tracking support 10 may include a transmission device 1. The transmission device 1 comprises a composite chain gear set 2 and a composite chain wheel set 3.

Figures 3, 4, 5:
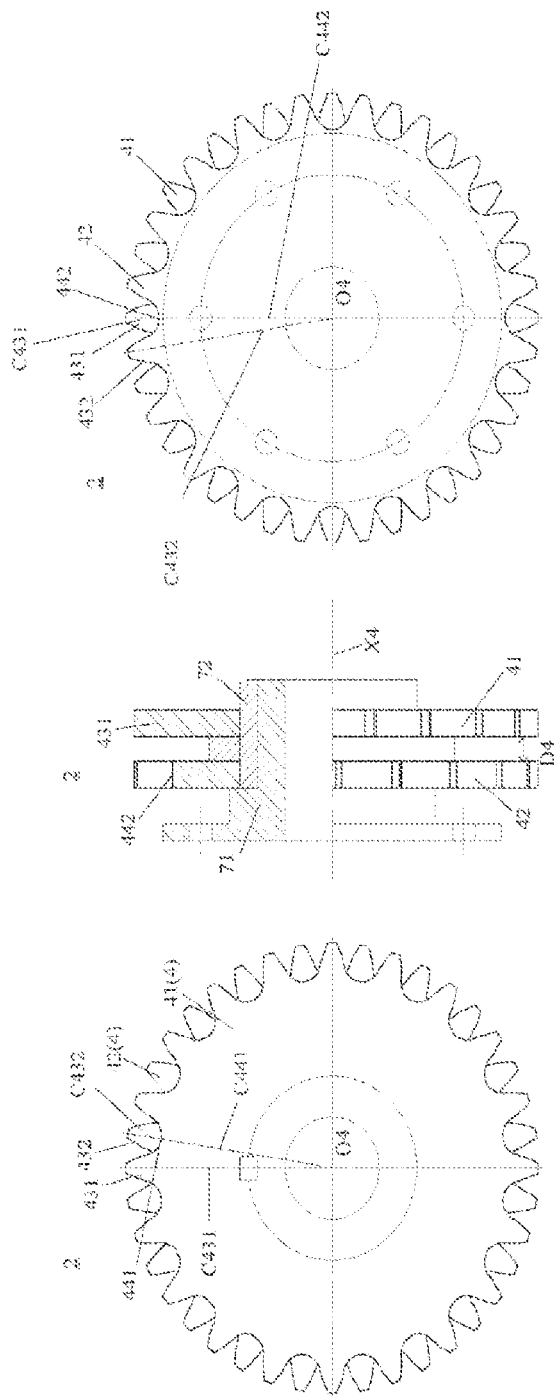
FIG. 3 is a front view of a composite chain gear set.
FIG. 4 is a side view of a composite chain gear set.
FIG. 5 is a rear view of a composite chain gear set.

As shown in FIGS. 3, 4 and 5, the composite chain gear set 2 has a plurality of chain gears 4. It is to be understood that "plurality" means more than one or two, including two, three, four, five, etc. In the embodiment shown in FIGS. 3 to 5, the composite chain gear set 2 has two chain gears 4, a first chain gear 41 and a second chain gear 42.

The plurality of chain gears 4 are arranged coaxially in a manner that the teeth are staggered with respect to each other. By "arranged in a manner that the teeth are staggered", among the plurality of chain wheels, the centerline of any tooth tip of one chain gear is not coincident (or, offset, staggered) with the centerline of any tooth tip of another chain gear, or the centerline of any tooth socket of one chain gear is not coincident with the centerline of any tooth socket of another chain gear. For example, in the embodiment shown in FIGS. 3-5, the first chain gear 41 and the second chain gear 42 have a common central axis X4, and the centerline C431 of the tooth tip 431 of the first chain gear 41 is offset from the centerline C432 of the tooth tip 432 of the second chain gear 42. FIGS. 3 to 5 also show the tooth socket 441 of the first chain gear 41 and the centerline C441 of the tooth socket 441, the tooth socket 442 of the second chain gear 42 and the centerline C442 of the tooth socket 442. Taking the first chain gear 41 as an example, "the centerline C431 of the tooth tip 431" means a line between the tooth vertex of the tooth tip 431 and the rotation center O4 (a projection point of the center axis X4 on the plane) on a plane perpendicular to the center axis X4, or an extension line of the line, as shown in FIG. 3; the "centerline C441 of the tooth socket 441" means, on a plane perpendicular to the of the tooth socket 441 and the rotation center O4 on a plane perpendicular to the central axis X4, or an extension of the line, as shown in FIG. 3.

Figure 7:
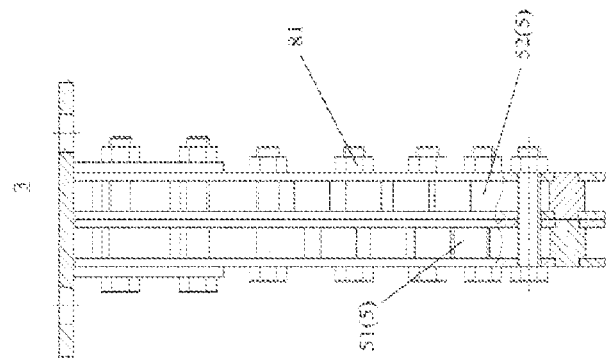
FIG. 7 is a side view of a composite chain wheel set.
Figure 6:
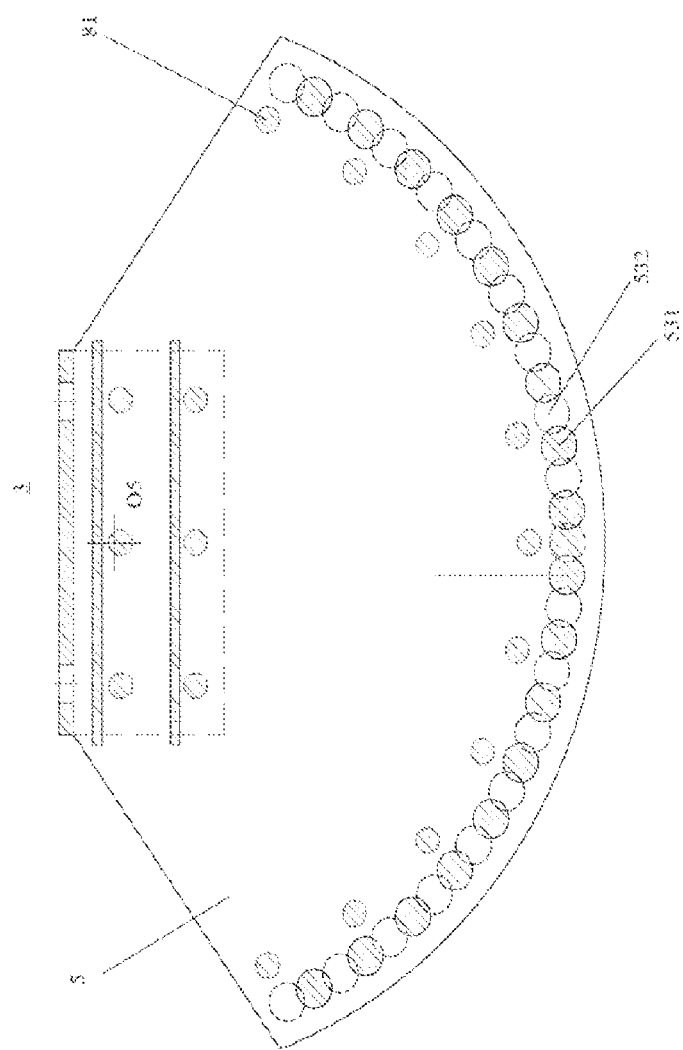
FIG. 6 is a front view of a composite chain wheel set.

As shown in FIGS. 6 and 7, the composite chain wheel set 3 has a plurality of chain wheels 5. A plurality of chain wheels 5 are also provided coaxially, and are in one-to-one correspondence to and meshing transmission with the multiple chain gears 4. As previously mentioned, in the illustrated embodiment, the composite chain gear set 2 has two chain gears 4, and therefore, in the embodiment shown in FIGS. 6 and 7, correspondingly, the composite chain wheel set 3 has two chain wheels 5, i.e., a first chain wheel 51 and a second chain wheel 52 that are in meshing transmission with the first chain gear 41 and the second chain gear 42, respectively. The first chain wheel 51 and the second chain wheel 52 have a common central axis projected on a vertical plane as a center of rotation 05, as shown in FIG. 6. It will be appreciated that the first chain gear 41 and the second chain gear 42 are arranged in a manner that the teeth are staggered and that the chain pins 531, 532 of the first chain wheel 51 and the second chain wheel 52, respectively, with which they are in meshing transmission therewith, are also in a staggered arrangement.

One of the composite chain gear set 2 and the composite chain wheel set 3 is rotatably provided on the stand column 20, and the other is connected to the main beam 30. In the illustrated embodiment, the composite chain gear set 2, as an example of one of the foregoing, is rotatably disposed on the stand column 20; the composite chain wheel set 3 is connected to the main beam 30 as an example of the other side described above.

With the chain wheel transmission is in different positions, a gap at a meshing point between the chain gear 4 and chain wheel 5 which are in meshing transmission and paired is constantly changing, as shown in FIGS. 8 to 11. It is to be understood that in FIGS. 8 to 11, the chain gear 4 may represent a first chain gear 41 or a second chain gear 42, etc., the chain wheel 5 may represent a corresponding first chain wheel 51 or a second chain wheel 52, etc., any tooth tip 43 of the chain gear 4 may represent the tooth tip 431 of the corresponding first chain gear 41 or the tooth tip 432 of the second chain gear 42, etc., any tooth socket 44 of the chain gear 4 may represent the tooth tip 441 of the corresponding first chain gear 41 or the tooth tip 442 of the second chain gear 42, etc. The centerline C43 of the tooth tip 43 may represent the centerline C431 of the tooth tip 431 of the corresponding first chain gear 41 or the centerline C432 of the tooth tip 432 of the second chain gear 42, etc., the centerline C44 of the tooth socket 43 may represent the centerline C441 of the tooth socket 441 of the corresponding first chain gear 41 or the centerline C442 of the tooth socket 442 of the second chain gear 42, etc., and the chain pin 53 of the chain wheel 5 may represent the chain pin 531 of the corresponding first chain wheel 51 or the chain pin 532 of the second chain wheel 52, etc.

When the centerline C43 of any tooth tip 43 of the chain gear 4 coincides with the center connection line L45 of the chain gear 4 and the chain wheel 5, the gap of the meshing point of the chain gear 4 and the chain wheel 5 is the maximum, as shown by G1 in FIG. 9, which can be defined as the first state. Here, the center connection line L45 of the chain gear 4 and the chain wheel 5 is a connection line of the rotation center 04 of the chain gear 4 and the rotation center 05 of the chain wheel 5.

Figure 11:
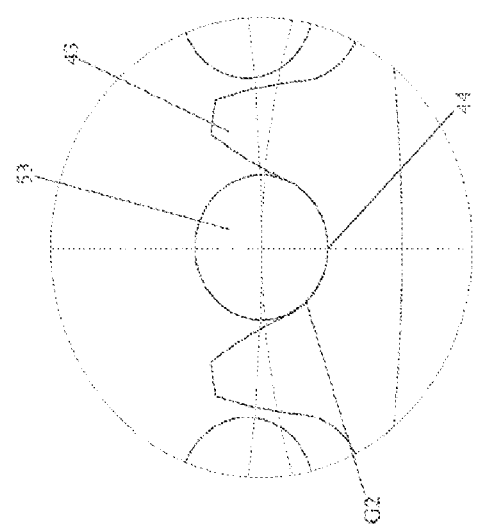
FIG. 11 is an enlarged view of a portion of FIG. 10 at the mesh site.

When the centerline C44 of any tooth socket 44 of the chain gear 4 coincides with the center connection line L45 of the chain gear 4 and the chain wheel 5, the gap of the meshing point of the chain gear 4 and the chain wheel 5 is minimized, as shown by G2 in FIG. 11, which can be defined as the second state. Therefore, the gap between the meshing points of the chain gear 4 and the chain wheel 5 is varied alternately during the chain gear meshing transmission.

When a strong wind comes temporarily, the greater the gap between the meshing points of the chain gear 4 and the chain wheel 5, the greater the amplitude of east-west back-and-forth shaking that may be generated by the photovoltaic tracking support; conversely, the smaller.

In addition, since the size of the gap between the mesh points of the chain gear 4 and the chain wheel 5 is alternately changed, the contact points of the chain gear 4 and the mesh points of the chain wheel 5 are also subjected to tangential sliding during transmission device, which causes local wear of the contact points of the chain gear 4 and the chain wheel 5. Furthermore, the greater the change in gap at the meshing point of the chain gear 4 with the chain wheel 5, the more severe local wear is caused, especially if the lubrication conditions at the meshing point are not good. Therefore, the smaller the gap and the better the gap variation of the meshing point of the chain gear 4 and the chain wheel 5 during the chain wheel drive.

In the above-mentioned transmission device 1, using two or more pairs of chain gears (the first chain gear 41 and the first chain wheel 51 which are paired, and the second chain gear 42 and the second chain wheel 52 which are paired), combined together, are arranged in a manner that the teeth are staggered (or, alternately, in a staggered combination), and using a relay transmission device, it is possible to reduce the chain wheel transmission gap as a whole and to reduce the gap variation when the gap of the meshing point of one pair of chain wheels (for example, the first chain gear 41 and the first chain wheel 51) is maximum and the gap of the meshing point of the other pair of chain wheels (for example, the second chain gear 42 and the second chain wheel 52) is not maximum. Thus, the ability of the photovoltaic tracking support to resist high wind sway can be improved, and the performance of the chain wheel drive, e.g., in the field without grease lubrication, can be improved, greatly increasing the service life of the drive.

For the embodiment shown in FIGS. 3-5, when the composite chain gear set 2 has a first chain gear 41 and a second chain gear 42, preferably the centerline C431 of any tooth tip 431 of the first chain gear 41 coincides with the centerline C442 of any tooth socket 442 of the second chain gear 42. It will be appreciated that the compound of the first chain wheel 51 and the second chain wheel 52 in the composite chain wheel set 3 also takes the same arrangement in a manner that the teeth are staggered to correspond to the composition of the first chain gear 41 and the second chain gear 42.

Figure 10:
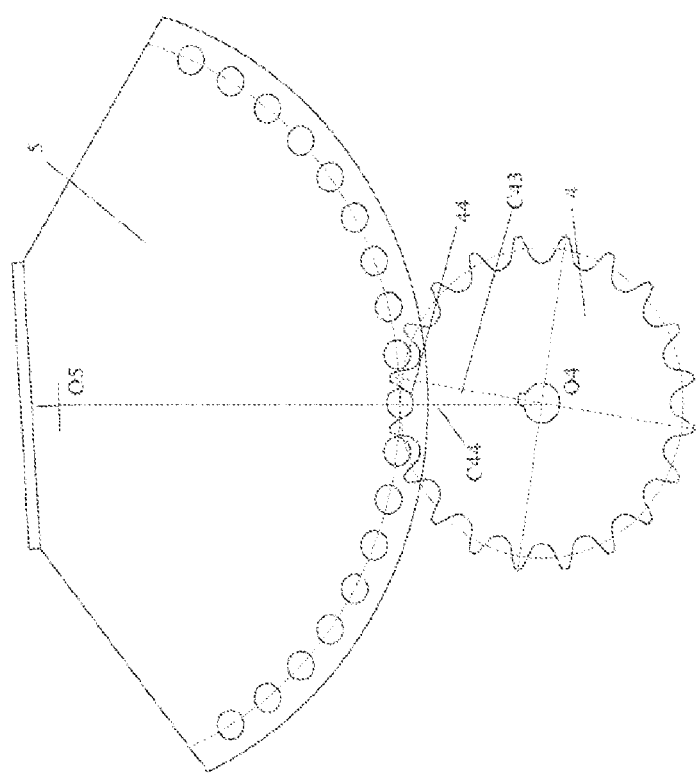
FIG. 10 is a schematic view of a chain gear and chain wheel in meshing transmission in a second state.

Thus, when the centerline C43 of any tooth tip 43 of the chain gear 4 in the first pair of chain wheels coincides with the center connection line L45 of the chain gear 4 and the chain wheel 5 (in the first state shown in FIGS. 8 and 9), the centerline C44 of any tooth socket 44 of exactly the chain gear 4 in the second pair of chain wheels coincides with the center connection line L45 of the chain gear 4 and the chain wheel 5 (in the second state shown in FIGS. 10 and 11). For example, when the centerline C431 of the tooth tip 431 of the first chain gear 41 coincides with the center connection line L45 of the first chain gear 41 and the first chain wheel 51, the centerline C432 of any tooth socket 432 of the second chain gear 42 coincides with the center connection line L45 of the second chain gear 42 and the second chain wheel 52. In other words, when the gap between the meshing points of the first pair of chain wheels is maximum, the gap of the meshing points of the second pair of chain wheels is minimum (or, nearly zero). In this way, it is possible to generally control the gap variation at the meshing point of the chain wheel and the chain wheel within a half-cycle range, so that the chain wheel drive gap is greatly reduced and the gap variation is greatly reduced. Therefore, it is possible to greatly improve the ability of the photovoltaic tracking support 10 to resist high wind sway, and at the same time, it is also possible to effectively improve the working performance of the chain wheel drive in the field without grease lubrication, thus greatly increasing the service life of the transmission device 1.

It will be appreciated that the relay drive may be carried out by compositing three or more pairs of chain wheels together and then subdividing the corresponding central angle of two adjacent teeth of the chain wheel into three or more equal parts, each pair of chain wheels corresponding to a portion of the central angle. For example, composite chain gear set 2 may have a first chain gear, a second chain gear and a third chain gear, the central angle corresponding to any two adjacent tips of the first chain gear being trisected by the centerline of any tip of the second chain gear and the centerline of any tip of the third chain gear. For example, as shown in FIG. 8, the chain gear 4 may be regarded as a first chain gear wheel, the central angle alpha corresponding to two adjacent tooth tips 43*a*, 43*b* is trisected by rays L2 and L3, and the second chain gear wheel and the third chain gear wheel may be arranged in a manner that the teeth are staggered such that the centerline of any tooth tip of the second chain gear wheel and the centerline of any tooth tip of the third chain gear wheel coincide with rays L2 and L3, respectively.

The larger the number of pairs of composite chain wheels, the smaller the gap and its variation during meshing and the smoother the transmission. At the same time, it should be considered that the larger the number of chain wheel sets, the larger the transmission mechanism and the higher the cost. Therefore, it should be considered comprehensively that the number of composite chain wheels should not be excessive, and two or three pairs are preferable.

The afore-mentioned chain gear 4 or chain wheel 5 may be a full-turn, complete circular wheel, or may be a non-full-turn, incomplete sector-shaped wheel. In actual setting, whether to use a sector-shaped wheel or a circular wheel can be determined according to the range of the corresponding working position. For example, if the working area is more than one cycle (including one cycle), the chain gear or chain wheel is usually a circular wheel; when the range of the working position is within one or even one-half cycle, the chain gear or the chain wheel may adopt a sector-shaped wheel to reduce the weight, and in particular, the sector center angle of the sector-shaped wheel may be set to be greater than the rotation angle corresponding to the range of the working position. Taking a flat single-axis tracking support as an example, the east-west tracking range of the photovoltaic tracking support 10 in actual operation generally does not exceed ±60°, and thus the actual tracking capability range may, for example, not exceed ±70°. In the illustrated embodiment, as an example of the above-mentioned connection of the other side of the main beam 30, the composite chain wheel set 3 has a plurality of chain wheels 5 each of which is a sector-shaped wheel connected below the main beam 30. Thus, the plurality of chain wheels 5 may not interfere with the photovoltaic module 50 supported by the main beam 30. Similarly, if the other side connecting the main beam 30 is a composite chain gear set 2, the plurality of chain gears 4 of the composite chain gear set 2 may all be sector-shaped wheels.

In the illustrated embodiment, the composite chain gear set 2 has a plurality of chain gears 4, each of which is a circular wheel, as an example of one of the afore-mentioned rotatably arranged stand columns 20. In meshing transmission, the rotation angle of the chain gear 4 in the form of a circular wheel is greater than the rotation angle of the corresponding chain wheel 5 in the form of a sector-shaped wheel, and the transmission ratio is greater than 1.

In the illustrated embodiment, the plurality of chain gears 4 have the same indexing radius, which ensures that the speed ratio formed by the corresponding pair of chain wheel sets is the same, thereby enabling synchronous transmission. In the illustrated embodiment, the number of teeth of the plurality of chain gears 4 is also the same, which makes it easier to obtain the desired relay drive mode. As previously mentioned, the chain gear 4 may be a sector-shaped wheel instead of a circular wheel, it being understood that when a sector-shaped wheel is used for the chain gear 4, the "number of teeth of a plurality of chain gears 4" means the number of teeth of a complete revolution when the chain gear 4 in the form of a sector-shaped wheel is complemented to a circular wheel of a complete revolution. Further, in the illustrated embodiment, the configuration and dimensions of the plurality of chain gears 4 are identical.

In the illustrated embodiment, a plurality of chain gears 4 may be fixedly connected to each other. The chain wheels 5 may also be fixedly connected to each other. For example, in FIG. 4, the first chain gear 41 and the second chain gear 42 are fixed together in series by being inserted through the center by a coupling shaft 71 having a key groove, and then prevented from rotating by being inserted into the key groove provided on the coupling shaft 71 by a key 72. In FIG. 7, the first chain wheel 51 and the second chain wheel 52 are secured together in series by fasteners 81, such as bolts.

The plurality of chain gears 4 may have an axial gap between each other. In the embodiment shown in FIG. 4, there is an axial gap D4 between the first chain gear 41 and the second chain gear 42.

Returning to FIGS. 1 and 2, the photovoltaic tracking support 10 may also include a drive unit 60 for driving the rotation of the composite chain gear set 2 as an example of one of the foregoing. The drive unit 60 may be, for example, a slewing reduction motor consisting of a slewing bearing plus a decelerator plus a motor. For example, a rotary reduction motor as an example of the drive unit 60 may be fixed to the stand column 20, and the composite chain gear set 2 may be fixed to the rotary output end of the rotary reduction motor, the plurality of chain gears 4 of the composite chain gear set 2 may be fixedly connected together, so that the drive unit 60 drives the plurality of chain gears 4 of the composite chain gear set 2 to rotate together, thereby driving the plurality of chain gears 5 of the composite chain wheel set 3 fully engaged therewith to rotate together, and the composite chain wheel set 3 is fixed to the main beam 30, thereby driving the main beam 30 and the photovoltaic module 50 supported thereby to rotate together. The drive unit 60 and the transmission device 1 constitute a drive device, and the photovoltaic tracking support 10 can track and drive a solar azimuth angle change by controlling a rotary reduction motor as an example of the drive unit 60 to perform forward and reverse rotation.

The use of the above-mentioned transmission device 1 allows the photovoltaic tracking support 10 to drive a photovoltaic module 50 of the same capacity with a drive unit 60, such as a rotary reduction motor, of relatively smaller size and with relatively lower cost and power consumption, as compared to the use of a drive unit to directly drive the photovoltaic tracking support for tracking rotation. Furthermore, the main beam 30 can still mount the photovoltaic module 50 at the location where the drive means are mounted, making the mounting arrangement of the photovoltaic module 50 on the main beam 30 of the photovoltaic tracking support 10 more compact.

With the development of photovoltaic power generation technology, photovoltaic tracking support has been widely used. The above-mentioned transmission device and the photovoltaic tracking support comprising the above-mentioned transmission device will have a very broad application prospect in the future photovoltaic power station construction.

Although the present invention has been described in terms of preferred embodiments, it is not intended to be limited to the embodiments shown, and alterations and modifications may be effected therein by one of ordinary skill in the art without departing from the spirit and scope of the invention. Therefore, it is intended that the present invention cover the modifications, equivalents, and alternatives falling within the spirit and scope of the invention as defined by the appended claims.

What is claimed is:

1. A photovoltaic tracking support transmission device, comprising:
    a stand column,
    a main beam,
    a composite chain gear set, and
    a composite chain wheel set,
    wherein the main beam is rotatably supported to the stand column and is configured to support a photovoltaic module,
    wherein the composite chain gear set comprises a plurality of chain gears,
    wherein the composite chain wheel set comprises a plurality of chain wheels,
    wherein each chain gear comprises a plurality of circumferential tooth tips,
    wherein the plurality of chain gears are arranged coaxially with respect to one another and are further arranged such that the tooth tips of each chain gears are staggered with respect to the tooth tips of an adjacent chain gear,
    wherein the plurality of chain wheels are arranged coaxially with respect to one another and provided in a one-to-one correspondence to, and configured to mesh with, the plurality of chain gears at a plurality of meshing points, and
    wherein one of the composite chain gear set and the composite chain wheel set is rotatably disposed on the stand column and the other is affixed to the main beam,
    wherein the staggered arrangement of the tooth tips of each chain gears with respect to the tooth tips of an adjacent chain gear reduces the overall gap present between the plurality of meshing points of the plurality of chain gears and plurality of chain wheels.

2. The photovoltaic tracking support transmission device according to claim 1, characterized in that the composite chain gear set comprises a first chain gear and a second chain gear, and
    wherein the centerline of each tooth tip of the first chain gear coincides with a midpoint between adjacent tooth tips of the second chain gear.

3. The photovoltaic tracking support transmission device according to claim 1, characterized in that each of the plurality of chain gears has a common radius.

4. The photovoltaic tracking support transmission device according to claim 3, characterized in that each of the plurality of chain gears have the same number of teeth.

5. The photovoltaic tracking support transmission device according to claim 1, characterized in that the composite chain wheel set comprises three chain gears, wherein a central angle
    between any two adjacent tooth tips of a first chain gear is trisected by the centerline of a tooth tip of a second chain gear and is further trisected by a centerline of a tooth tip of a third chain gear.

6. The photovoltaic tracking support transmission device according to claim 1, characterized in that at least one of the plurality of chain gears or the a plurality of chain wheels are sector-shaped wheels connected below the main beam.

7. The photovoltaic tracking support transmission device according to claim 1, characterized in that at least one of the plurality of chain gears are fixedly connected to each other or the plurality of chain wheels are fixedly connected to each other.

8. The photovoltaic tracking support transmission device according to claim 1, characterized in that the composite chain gear set is rotatably disposed on the stand column and is rigidly affixed to the main beam.

9. The photovoltaic tracking support transmission device according to claim 1, further comprising a photovoltaic module affixed to the main beam.

10. The photovoltaic tracking support transmission device according to claim 9, further comprising a drive unit configured to rotate the main beam relative to the stand column.

* * * * *